United States Patent
Garrett et al.

(10) Patent No.: US 8,201,166 B2
(45) Date of Patent: Jun. 12, 2012

(54) VIRTUALIZATION PLATFORM CONFIGURED WITH VIRTUAL CONNECT CONTROL

(75) Inventors: Michael R. Garrett, Cypress, TX (US); Thomas J. Bonola, Cypress, TX (US); Mike Dickson, Magnolia, TX (US); John M. Hemphill, Sprint, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 989 days.

(21) Appl. No.: 12/113,062

(22) Filed: Apr. 30, 2008

(65) Prior Publication Data
US 2009/0276772 A1 Nov. 5, 2009

(51) Int. Cl.
*G06F 9/46* (2006.01)
*G06F 15/16* (2006.01)
(52) U.S. Cl. ............................................. 718/1; 709/203
(58) Field of Classification Search .................. None
See application file for complete search history.

(56) References Cited

U.S. PATENT DOCUMENTS

| | | | |
|---|---|---|---|
| 5,392,409 A * | 2/1995 | Umeno et al. ............. 718/1 |
| 7,934,020 B1 * | 4/2011 | Xu et al. ................ 709/250 |
| 2006/0007901 A1 * | 1/2006 | Roskowski et al. ...... 370/338 |
| 2007/0174361 A1 | 7/2007 | Branda et al. | |
| 2007/0186025 A1 | 8/2007 | Boyd et al. | |
| 2007/0204265 A1 | 8/2007 | Oshins | |
| 2007/0260910 A1 | 11/2007 | Jain et al. | |
| 2008/0005297 A1 | 1/2008 | Kjos et al. | |
| 2009/0106571 A1 * | 4/2009 | Low et al. ............... 713/310 |

* cited by examiner

*Primary Examiner* — Kenneth Tang

(57) ABSTRACT

A data processing system enables configuration of a virtual connect functioning in combination with a virtualization platform. The illustrative data processing system is used with a virtualization platform which is configured to run multiple operating systems simultaneously on one or more physical servers and a virtual connect device which is communicatively coupled to the virtualization platform. The virtual connect device virtualizes connections between the physical server or servers and a network infrastructure. The data processing system comprises a configuration manager that integrates migration and failover of virtual machines operating under the virtualization platform with migration and failover of physical servers operative under the virtual connect device for management of virtual and physical migration and failover using common commands.

17 Claims, 5 Drawing Sheets

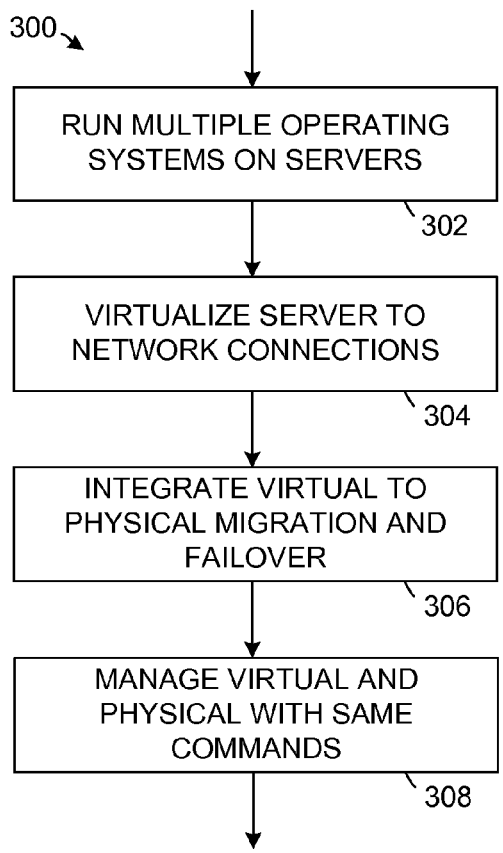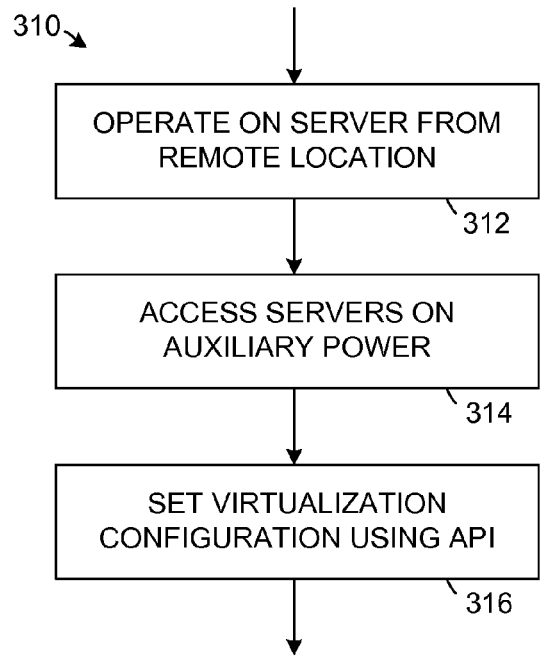
FIG. 3A
FIG. 3B

VIRTUALIZATION PLATFORM CONFIGURED WITH VIRTUAL CONNECT CONTROL

BACKGROUND

Virtual machine technology is used to create and concurrently run one or more guest operating systems on a physical device. One or more virtual machines can operate on a single host computing system, each including an operating system with concurrent applications.

Traditionally, virtual machines are managed from a different management application/infrastructure from physical computers operating as remote physical client computers that access the server over a network.

SUMMARY

Embodiments of a data processing system enable configuration of a virtual connect operating in combination with a virtualization platform. The illustrative data processing system is used with a virtualization platform which is configured to run multiple operating systems simultaneously on one or more physical servers and a virtual connect device which is communicatively coupled to the virtualization platform. The virtual connect device virtualizes connections between the physical server or servers and a network infrastructure. The data processing system comprises a configuration manager that integrates migration and failover of virtual machines operating under the virtualization platform with migration and failover of physical servers operative under the virtual connect device for management of virtual and physical migration and failover using common commands.

BRIEF DESCRIPTION OF THE DRAWINGS

Embodiments of the invention relating to both structure and method of operation may best be understood by referring to the following description and accompanying drawings:

FIGS. 3A through 3C are flow charts illustrating one or more embodiments or aspects of a computer-executed method for configuring a virtual connect functioning in combination with a virtualization platform.

DETAILED DESCRIPTION

Various embodiments of a data processing system, virtualized network system, and associated control techniques combine functionality of a virtualization platform such as a hypervisor or Virtual Machine Monitor (VMM) and a virtual connect device so that virtual and physical resources can be managed using similar or identical control operations.

In a specific embodiment a Hypervisor can be configured for operation in combination with virtual connect technology.

The illustrative data processing system and associated techniques enable management of virtual computers running in a virtualization platform such as hypervisor communicating with a virtual connect, enabling a larger portion of a management software stack to apply to virtual computers as well as physical computers. The hypervisor can communicate with virtual connect to preserve network topologies previously defined by the virtual hypervisor environment and virtual connect enclosure manager.

Failover and migration of a computer application can be realized either for physical hardware or for virtual machines running in a hypervisor or VMM.

A virtual connect device can be used to migrate computer system characteristics from one physical computer to another, enabling physical migration of applications from one computer to another without licensing or configuration problems.

Virtualization platforms such as hypervisors and VMMs enable migration in a different way by moving virtual machines from one virtualization platform to another using various types of management applications, a property that can be called "motion."

Figure 1:
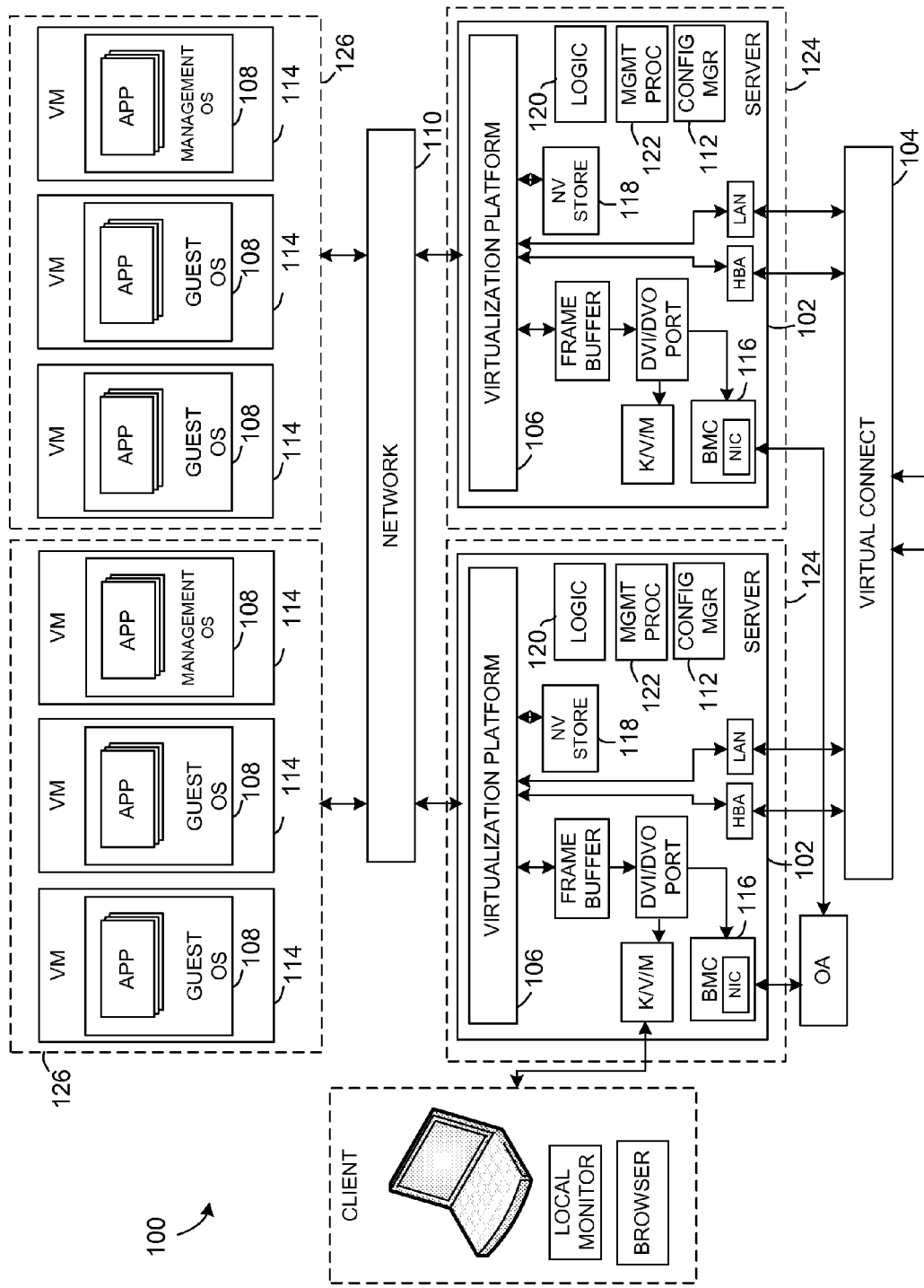
FIG. 1 is a schematic block diagram depicting an embodiment of a data processing system that enables configuration of a virtual connect functioning in combination with a virtualization platform.

Referring to FIG. 1, a schematic block diagram depicts an embodiment of a data processing system 100 that enables configuration of a virtual connect 104 functioning in combination with a virtualization platform 106. The illustrative data processing system 100 is used with a virtualization platform 106 which is configured to run multiple operating systems 108 simultaneously on one or more physical servers 102 and a virtual connect device 104 which is communicatively coupled to the virtualization platform 106. The virtual connect device 104 virtualizes connections between the physical server or servers 102 and a network infrastructure 110. The data processing system 100 comprises a configuration manager 112 that integrates migration and failover of virtual machines 114 operating under the virtualization platform 106 with migration and failover of physical servers 102 operative under the virtual connect device 104 for management of virtual and physical migration and failover using common commands.

In the illustrative embodiment, the virtual platform 106 and virtual connect system 104 are separate entities that synergistically coexist and improve performance in comparison to either technology operating independently.

The configuration manager 112 integrates the two types of migration/failover (virtual and physical) under virtual connect 104 and enables value-added management components to manage both virtual and physical migration/failover. The configuration manager 112 further enables users to manage virtual servers, also called virtual machines (VMs) 114, in the same way that physical servers 102 are managed and further enables a larger portion of management software to be applicable to the virtual environment because any dependencies on virtual connect 104 become a path into virtual machine management.

The configuration manager 112 enables the physical hardware capabilities of the virtual connect 104 and higher level applications of the virtual connect 104 to be seamlessly performed with virtual servers 114 as well. Such physical hardware and virtual resource capabilities include migration of identity from one server to another, failover, and the like.

In some embodiments, the data processing system 100 can further comprise the virtualization platform 106 which runs one or more operating systems 108 simultaneously on the physical server or servers 102.

Similarly in some embodiments, the data processing system 100 can comprise the virtual connect device 104 communicatively coupled to the virtualization platform 106. The virtual connect device 104 virtualizes connections between the physical servers 102 and the network infrastructure 110.

Some implementations of the data processing system 100 can also include a physical server 102 that is communicatively coupled to the virtualization platform 106 and configured to run the operating systems 108.

The data processing system 100 can further comprise a baseboard management controller 116 coupled to the virtual connect device 104 that controls virtualization platform configuration in all conditions including powered-on, powered-off, and unbooted conditions.

An example of a baseboard management controller 116 is integrated Lights-Out (iLO) which is made available by Hewlett-Packard Company of Palo Alto, Calif.

The baseboard management controller 116 can be configured to enable an application to control virtualization platform configuration from a remote location.

The illustrative data processing system 100 enables virtual connect (VC) products to integrate with virtualization platforms 106, such as Hypervisors, virtual machine monitors (VMMs), and the like, by use of a non-volatile data structure in the form of a non-volatile state storage 118 which may be called a "Persistent State" storage. Persistent state storage enables management applications to control the hypervisor configuration, even when the configuration is not booted.

Management of physical and virtual resources through the non-volatile state storage 118 improves operation in comparison to a technique in which virtual connect 104 makes calls into a programmatic interface supplied with the virtualization platform 106 since such operation would be functional only when the virtualization platform 106 is booted. Furthermore calls into the programmatic interface would have differing applications program interfaces (APIs) depending on the particular virtualization platform. In contrast, the illustrative data processing system 100 and associated operating technique is scaleable and enables management for an unbooted computer.

For example, a non-volatile state storage 118 coupled to the server or servers 102 can be used in combination with the baseboard management controller 116. The non-volatile state storage 118 stores a persistent state of server profiles for the servers 102 for integrating the virtual connect device 104 with the virtualization platform 106.

The virtual connect device 104 manages a pool of "server profiles" that contain, among other things, the server Universal Unique Identifier (UUID), serial number, Network Interface Controller (NIC) Media Access Control (MAC) addresses, storage World Wide Names, and other information. The profile contains the essential identifiers that uniquely identify a server unique.

Persistent state can be accessible by a baseboard management controller 116 on auxiliary power (aux-power) only, when a physical computer 124 is unbooted or powered-off. Accordingly, the configuration of the virtualization platform 106 or hypervisor can be performed via a baseboard management controller 116 or iLO remote Application Programming Interface (API) from a management tool such as virtual connect device 104.

The non-volatile state storage 118 can be configured to enable an application to access the baseboard management controller 116 on auxiliary-power-only when the one or more servers 102 are unbooted or powered-off.

In some embodiments, the data processing system 100 can further include logic 120 operable in the virtual connect device 104 that configures the virtualization platform 106 via a remote Application Programming Interface (API) in the non-volatile state storage 118.

In a particular implementation, the virtual connect device 104 can be configured to manage a pool of server profiles stored in the non-volatile state storage 118, whereby the server profiles comprise identifiers that uniquely describe a server. The virtual connect device 104 can access the non-volatile state storage 118 and management processors 122 to push and pull server profiles to physical 124 or virtual 126 computer systems whereby the non-volatile state storage 118 enables the virtual connect device to push a target server profile into a virtualization platform configuration even before a target server bootstrap loads or powers-on.

The target server upon bootstrap loading can be configured to consume the target server profile and instantiate identifiers of the target server profile on virtual hardware 126 within a virtual machine 114.

In a particular implementation, virtual connect 104 can access iLO 116 and other management processors to push and pull server profiles to physical or virtual computer systems. Through the ability of iLO 116 to write persistent state data for a hypervisor, virtual connect 104 can push a server profile into the hypervisor configuration, even before booting or power-on. Upon boot-up, the hypervisor 106 boots, consumes the UUID, serial number, MAC, WWNs and other unique identifiers from persistent state and surfaces the information on the virtual hardware 126 within a virtual machine 114.

Figure 2:
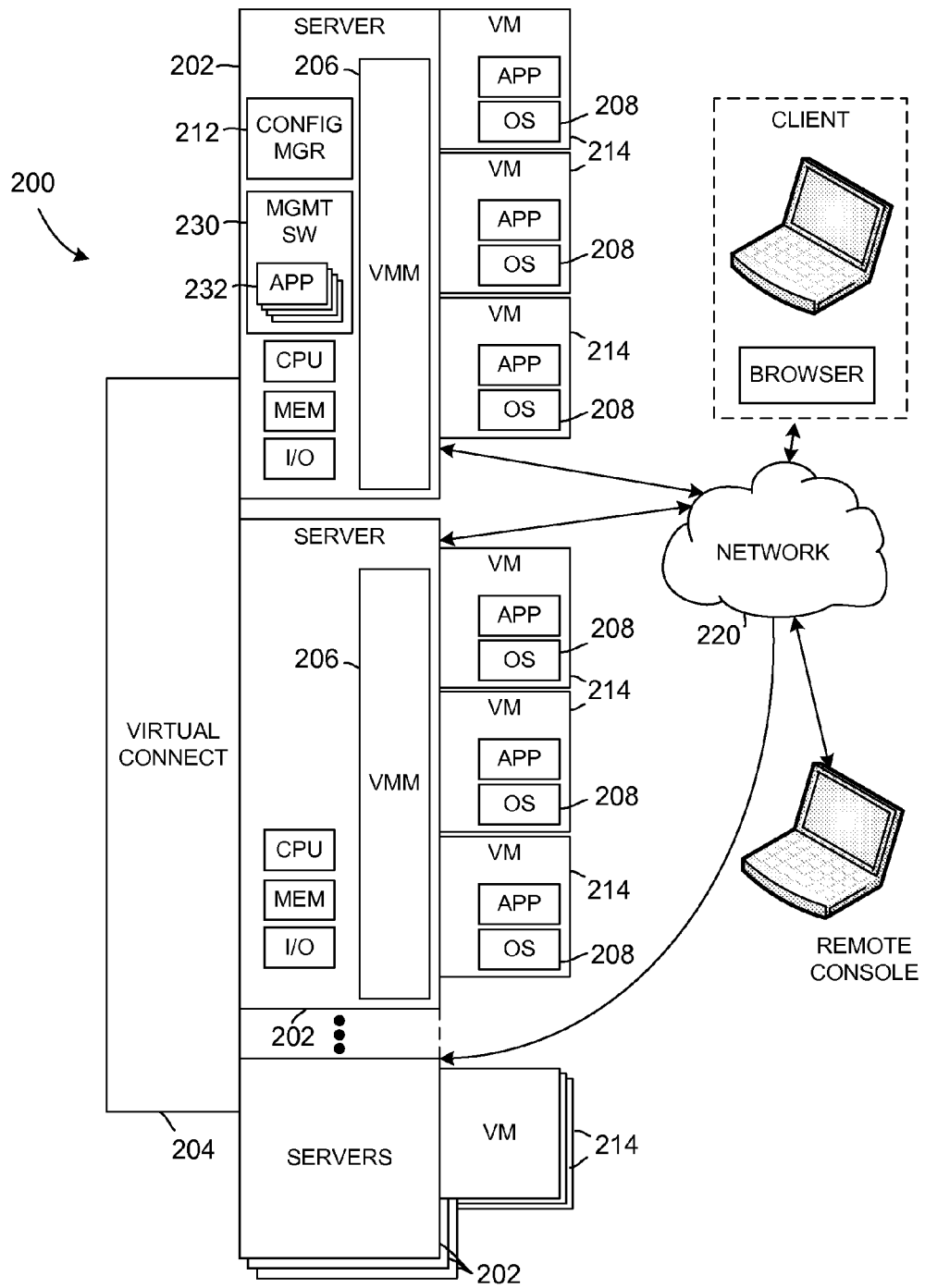
FIG. 2 is a schematic block diagram showing an embodiment of a virtualized network system that enables configuration of a virtual connect functioning in combination with a virtualization platform.

Referring to FIG. 2, a schematic block diagram depicts another embodiment of a data processing system 200 that enables configuration of a virtual connect 204 functioning in combination with a virtualization platform 206. The data processing system 200 comprises a network 220, a virtualization platform 206, and multiple physical servers 202 communicatively coupled to the network 220 and the virtualization platform 206. The virtualization platform 206 runs multiple operating systems 208 simultaneously on one or more physical servers 202 and a virtual connect device 204 which is communicatively coupled to the virtualization platform 206. The virtual connect device 204 virtualizes connections between the physical servers 202 and the network 220. The data processing system 200 comprises a configuration manager 212 that integrates migration and failover of virtual machines 214 operating under the virtualization platform 206 with migration and failover of physical servers 202 operative under the virtual connect device 204 for management of virtual and physical migration and failover using common commands.

The data processing system 200 can comprise management software 230 that manages virtual machines 214 and physical servers 202 identically through the virtual connect device 204 and through management applications 232 that operate through the virtual connect device 204.

Figure 3C:
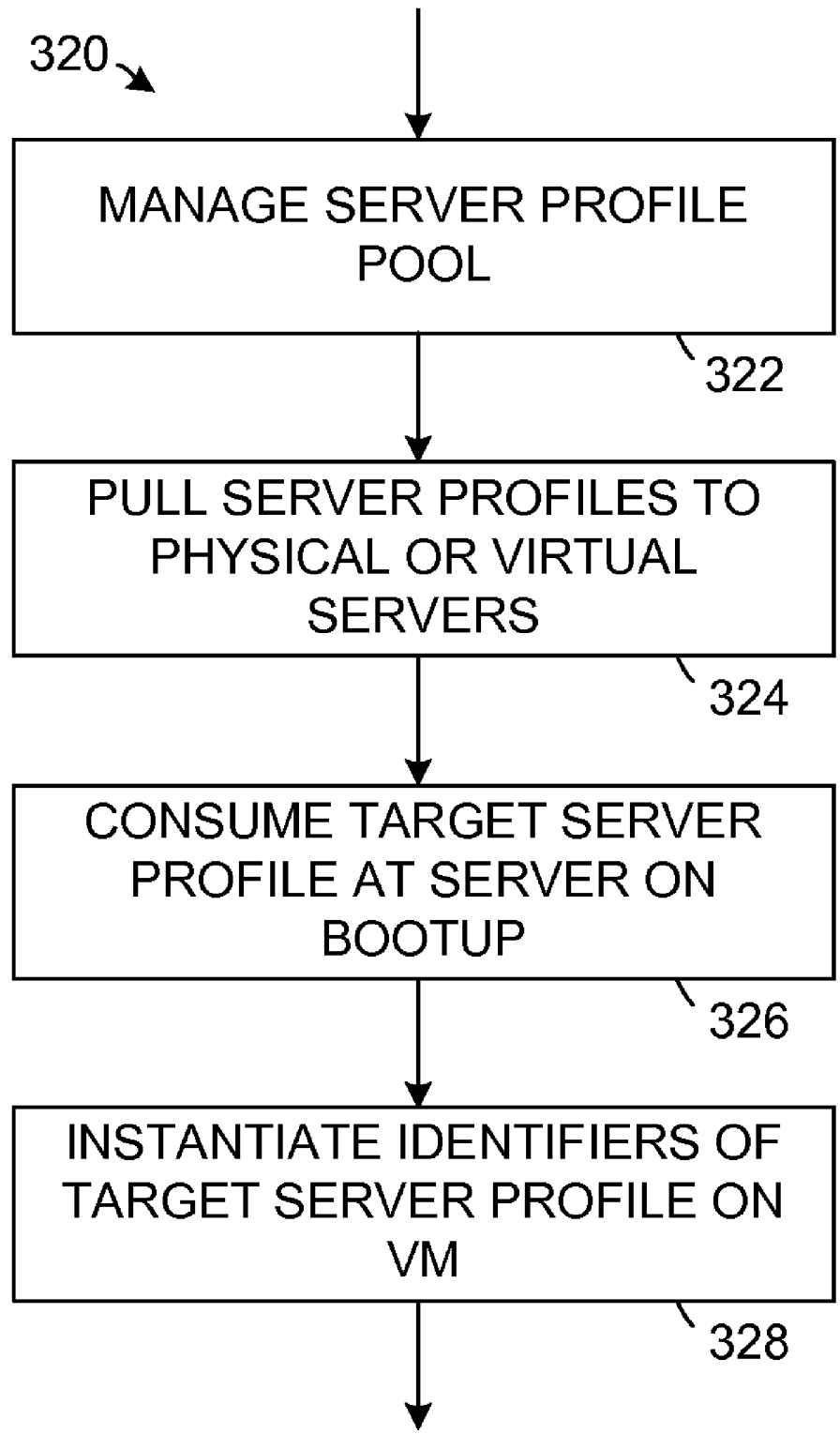

Referring to FIGS. 3A through 3C, flow charts illustrate one or more embodiments or aspects of a computer-executed method 300 for configuring a virtual connect functioning in combination with a virtualization platform. FIG. 3A depicts a computer-executed method 300 for operating a virtualized computing system comprising running 302 multiple operating systems simultaneously on one or more physical servers, and virtualizing 304 connections between the physical servers and a network infrastructure. Migration and failover of virtual machines are integrated 306 with migration and failover of physical servers. Virtual and physical migration and failover are managed 308 using common commands.

Virtualization configuration can be controlled in all conditions including powered-on, powered-off, and unbooted conditions.

Referring to FIG. 3B, a virtualization method 310 can comprise performing 312 operations on the at least one server from a remote location, and accessing 314 the server or servers on auxiliary-power-only when server is unbooted or powered-off.

In some embodiments, the virtualization configuration can be set 316 via a remote Application Programming Interface (API).

As shown in FIG. 3C, a computer-executed method 320 can comprise managing 322 a pool of server profiles including identifiers that uniquely describe a server, and pushing and pulling 324 server profiles to physical or virtual servers whereby server profiles can be pushed to a target server even before the target server bootstrap loads or powers-on. The target server profile can be consumed 326 at the target server upon bootstrap loading. Identifiers of the target server profile are instantiated 326 on virtual hardware within a virtual machine.

Figure 4A:
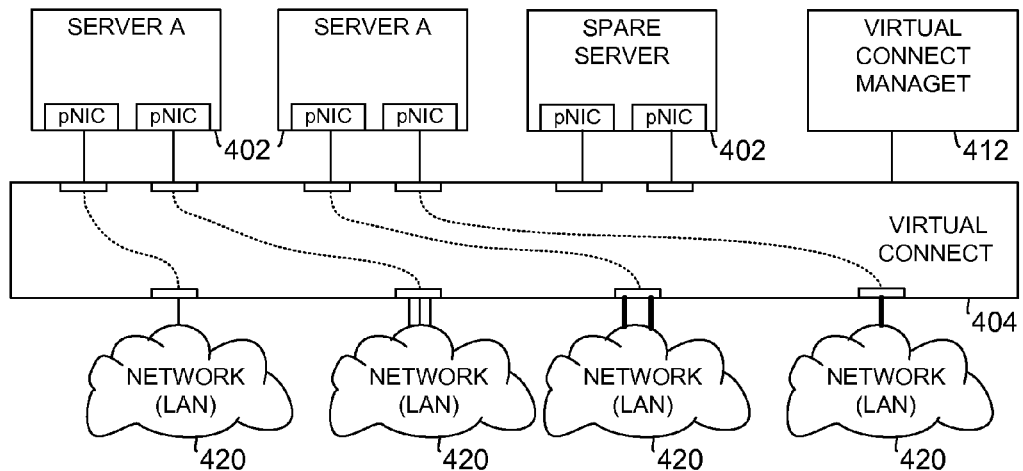
FIGS. 4A and 4B are schematic block diagrams illustrating an embodiment of a virtual connect that can be used in a data processing system or virtualized network system.
Figure 4B:
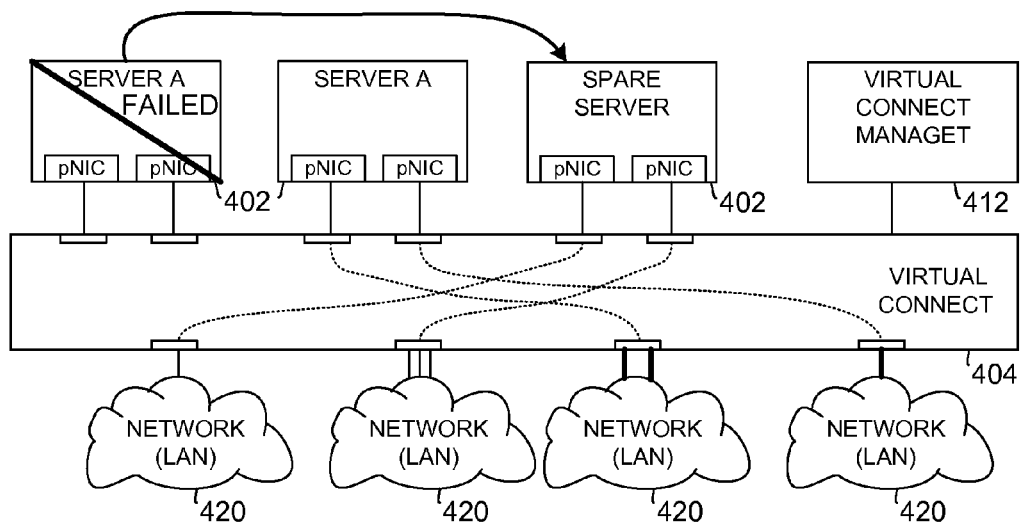

Referring to FIGS. 4A and 4B, schematic block diagrams illustrate an embodiment of a virtual connect 404 that can be used in a data processing system or virtualized network system. Virtual connect 404 can implement server-edge input/output (I/O) virtualization by interposing an abstraction layer between the servers 402 and external networks so that a local area network (LAN) 420 and storage area network (SAN) see a pool of servers rather than individual servers. LAN 420 and SAN connections are made to the pool of servers, and a server administrator uses a virtual connect manager user interface to create an I/O connection profile for each server. Instead of using default media access control (MAC) addresses for all network interface controllers (NICs) and default World Wide Names (WWNs) for all host bus adapters (HBAs), the virtual connect manager 412 creates bay-specific I/O profiles, assigns unique MAC addresses and WWNs to the profiles, and administers the profiles locally. Local administration of network addresses is applied by virtual connect so that network and storage administrators can establish all LAN and SAN connections once during deployment and not subsequently make connection changes if servers are changed. As servers are deployed, added, or changed, virtual connect maintains the I/O profile for that LAN and SAN connection constant.

Virtual connect manager 412 facilitates upgrade and/or replacement of a server 402 by enabling the server administrator to reassign the I/O profile to a new server. Also, virtual connect manager 412 enables the administrator to move a virtual connect profile from a failed server to a spare server, all functionality that can be embedded in a virtual connect module. FIG. 4B depicts migration showing an administrator moving Ethernet MACs, Fibre Channel WWNs, and Fibre Channel boot parameters of a failed server to a spare server.

The non-volatile state storage or persistent state technology can be used to extend functionality of a virtualization platform. A conventional virtualization platform is managed as any typical operating system or software loaded on physical computer system hardware wherein the configuration can only be managed when the virtualization platform is booted and running. Configuration data that backs the virtualization platform configuration in a conventional system is not tied in any way to the hardware upon which the platform resides except perhaps on a hard disk, which is replaceable.

The non-volatile state storage, persistent state technology described herein recognizes that a virtualization platform creates multiple virtual machines to the user of a computer system and can thus be considered by the user to be an extension of the computer hardware itself rather than simply software running on the hardware. Accordingly, improved functionality can be attained by managing operations as an extension of computer hardware, enabling users to manage the virtualization platform configuration with the same level of capability as for management of physical hardware. The non-volatile state storage, persistent state technology further includes a capability to configure remotely from a management console even when the computer's main power is disabled. The configuration data is tied to the physical hardware.

The non-volatile state storage comprises a data storage repository tied to the physical computer hardware and a data format that govern the virtualization platform configuration.

In an example embodiment, the persistent state enables off-line edits of the virtualization platform configuration by software and firmware, even in powered-off states where only aux-power is supplied to the system. The configuration items of interest can be virtual machines, networks, virtual disk images, physical resource reservations, and the like.

Virtual machine configuration can be controlled using create, delete, edit, add network interface controller (NIC), delete NIC, edit NIC, add storage controller, delete storage controller, and edit storage controller. Virtual machine edits can apply to name, description, serial number, Universally Unique IDentifier (UUID), default power state, memory configuration, CPU configuration, preboot execution environment (PXE) configuration, and boot order. Network interface controller (NIC) edits can apply to name, network, media access control (MAC) addresses, and the like. Storage controller edits can apply to name, virtual disk image name, bootable, writable, and selection of CD/DVD versus hard disk.

The non-volatile state storage can be used in virtualization platform creation and management of networks and virtual disk images. Other components can only reference the networks by name.

The non-volatile state storage can be used for physical resource reservations applied to CPUs, memory, peripheral component interconnect (PCI), I/O ports, and the like.

The persistent state can be synchronized with native configuration data by operation of the virtualization platform which honors the persistent state at startup and monitors persistent state periodically for changes during uptime. The virtualization platform can be made responsible for all reconciliation between persistent state and internal native configuration including remote resource pools. For example, the virtualization platform can implement periodic 2-way synchronization. Online changes to the virtualization platform configuration are written back to persistent state so that management tools can read an accurate configuration. To ensure efficiency, all writers including the virtualization platform can be implemented to avoid unnecessary writes and limit rewrites to changes in configuration.

The non-volatile state storage comprises a data repository. For example, a persistent system state can be stored in a primary partition on embedded media and can be marked with a non-standard partition type. The format of the partition is not a file system. Instead each consecutive linear sector number is mapped into contiguous memory, so that the contents become memory-mapped. Modifications can occur in memory and the memory is mapped directly back to sector numbers and written to the mass storage device. Some implementations of the partition can be storage on a Universal Serial Bus (USB) key, secure data card, or the like located inside the computer chassis. The simple sector-to-memory mapping enables non-file-system-aware software to read and write the data without having to implement file system support.

Persistent state can be implemented in different storage media and devices including NVRAM, ROM Flash sectors, USB Flash media, and others.

In an example implementation, the flash device containing the persistent state bits may be present on any USB storage device. Externally accessible USB ports are given priority over internal ports for both booting the hypervisor and accessing persistent state. Readers and writers of persistent state scan attached USB storage in priority order to find persistent state. Persistent state can be stored in a primary partition on the flash media and marked with a non-standard partition type indicating that the media is solely for the purpose of supporting an integrated virtualization platform. The format of the partition is not a file system. Instead each consecutive linear sector number is mapped into contiguous memory, so that the contents become memory-mapped. Modifications can occur in memory and the memory is mapped directly back to sector numbers and written to the key/card.

Once memory-mapped, the data remains unsuitable for editing. The format of the data and the fact that the virtualization platform does not include the persistent state as a native configuration file means that all software readers and writers are to "unpack" the data for editing, and "repack" for writing. A characteristic that does not imply compression or encryption but simply means that the data structure does not have fixed sizes for strings, for example, so as strings increase in length, the remainder of the data structure shifts. Thus, most writers unpack the structure allowing each string sufficient room during editing. Similarly, the number of virtual machines can change, causing shifts in the remaining data.

Readers and writers of the persistent state storage can include virtualization platform software and management software such as baseboard management controller firmware, BIOS setup, and the like, which can read and write the persistent state data. In some implementations, the data structure can include a semaphore mechanism to prevent write-concurrency corruption.

Concurrent access of the non-volatile state storage is enabled with some constraints to ensure correct operation. Several software and firmware components can be readers and writers of persistent state including the virtualization platform, a software component that runs after boot but executes after the virtualization platform starts as part of the boot chain, a ROM-based setup utility that runs at user request and exits prior to boot, and the baseboard management controller, an asynchronous management processor that can alter parameters in power-on, power-off, or on auxiliary power. In an illustrative embodiment, concurrency difficulties only arise if the baseboard management controller.

Atomic commits are used to safely write persistent state in a multiple-writer environment. For example, in a configuration for which baseboard management controller does not write to the non-volatile state storage, atomic commits are not necessary. In configurations that the baseboard management controller does write to non-volatile state storage, atomic commits can be controlled by a memory-mapped semaphore protocol, for example as defined by baseboard management controller firmware. A suitable write procedure can include finding the semaphore control structure in memory, searching a legacy BIOS range for a marker, parsing the data structure at the marker which points to the semaphore structure, following the pointer to the semaphore structure in the address space, and accessing the semaphore for control.

The data format or layout of the illustrative non-volatile state storage takes into consideration that some of the critical readers and editors of the persistent state are "primitive" in that access to a file system, an I/O library, string libraries, or networking, is not enabled and are implemented in assembly language. As a consequence, eXtensible Markup Language (XML) is not a viable choice considering the complexity and variable length string operations. A constant-sized structure is inappropriate for primitive software since such a structure is non-extensible (and therefore hard to version-control), and strings and arrays would have to be of predetermined size resulting in wasted space or future limitations.

In light of the two opposing goals of XML-like extensibility and ease of parsing for primitive software, the illustrative non-volatile state storage implements a format that combines binary data structures with hierarchy and extensibility.

The data format proposed herein is based upon binary data instead of strings, and is thus simple for low-level software to parse. However, because the data format is extensible, no version management difficulties are imposed and robust handling of unknown data elements as well as missing data elements is supported. The hierarchical nature of the format enables data to be logically organized in a tree-like structure. Signatures that define separate elements of data are strongly typed and divided into namespaces to prevent data definition collisions between hardware and virtualization platform suppliers.

An example data format includes persistent state configuration data that is preceded by a header that contains basic integrity and schema version information. Given the two opposing goals of XML-like extensibility and ease of parsing for primitive software, the result is a compromise best likened to a binary XML format which, from a parsing perspective, is similar to SMBIOS except being hierarchical instead of linear. Binary XML format combines the byte packing and type iteration of SMBIOS with the hierarchy of XML and has characteristics of constant-sized elements declarations, only a single root element in the manner of XML, no attributes, and elements that can either contain child elements or a predefined binary data structure (in place of XML child text) associated with the element signature. For parsers to handle unknown element signatures, the element signature has a bit that determines type, for example 1=child elements, 0=structure.

An element declaration can be defined as multiple bit fields with each element string given an identifier, an indication of children or structure. For a name with a child text string, a binary structure is created. An in-memory binary data structure can include a sequence of, for example, a virtual machine root element signature, a number of children elements, and one or more virtual machine element signatures, each including a number of child elements, a name element signature, structure length, and binary structure (string).

Element namespaces can be assigned in accordance with an intention of the persistent state format is to be extensible like traditional XML. Thus element value assignments can be formed to ensure conflict-free usage. A subset of element value bits can thus be reserved for company signature. Since the purpose of persistent state is for proprietary management of the virtualization platform, configuration data that is to be managed can be specified to be assigned according to the company signature. Thus, the company namespace can be given priority when storage space is limited.

For unknown elements, defined as elements that may be written that are not understood by all parsers, several rules can be applied. First, every writer is to preserve elements that are not understood, including order and hierarchy. Second, readers can traverse unknown elements according to a bit in the element signature and a count following the element signature to iterate through child elements and skipping over data structures. Persistent state can be presumed to not be the native configuration file for the virtualization platform, so if virtualization platform-specific elements are missing default values or values from the native configuration file can be assumed as appropriate.

Missing and/or optional elements can be handled according to several rules. If an element is missing that contains a data structure child, a clear set of default values is specified. If a child element is missing from a set owned by a parent, the set is likely changed purposely changed and the virtualization platform acts accordingly.

The illustrative non-volatile state storage and implementation of embedded persistent state on a computer system, in combination with the proposed data format that enables data to be read and written by low-level software and firmware enable the virtualization platform to read and honor changes made by a management processor when a computer is powered-off. A user can configure virtual machines much like physical machines from a BIOS setup utility before the virtualization platform boots. The persistent data is embedded in the physical computer hardware, reducing dependencies upon removable hard disks and network access.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, functionality, values, process variations, sizes, operating speeds, and the like. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

The block diagrams and flow charts further describe an article of manufacture comprising a controller-usable medium having a computer readable program code embodied in a controller for managing virtual machines (VMs) in a distributed network system.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A data processing system for usage with a virtualization platform configured to run a plurality of operating systems simultaneously on at least one physical server and a virtual connect device communicatively coupled to the virtualization platform that virtualizes connections between the at least one physical server and a network infrastructure, the data processing system comprising:
   a configuration manager that integrates migration and failover of virtual machines operating under the virtualization platform with migration and failover of physical servers operative under the virtual connect device for management of virtual and physical migration and failover using common commands; and
   a non-volatile state storage that stores server profiles, said storage enables the virtual connect device to push a target server profile into a virtualization platform configuration even before a target server bootstrap loads or powers-on;
   wherein the target server upon bootstrap loading is configured to consume the target server profile and instantiate identifiers of the target server profile on virtual hardware within a virtual machine.

2. The system according to claim 1 further comprising:
the virtualization platform configured to run the plurality of operating systems simultaneously on the at least one physical server.

3. The system according to claim 1 further comprising:
the virtual connect device communicatively coupled to the virtualization platform that virtualizes connections between the at least one physical server and the network infrastructure.

4. The system according to claim 1 further comprising:
a baseboard management controller coupled to the virtual connect device that controls virtualization platform configuration in all conditions including powered-on, powered-off, and unbooted conditions.

5. The system according to claim 4 further comprising:
the baseboard management controller configured to enable an application to control virtualization platform configuration from a remote location.

6. The system according to claim 1 further comprising:
the non-volatile state storage configured to enable an application to access the baseboard management controller on auxiliary-power only when the at least one server is unbooted or powered-off.

7. The system according to claim 1 further comprising:
logic operable in the virtual connect device that configures the virtualization platform via a remote Application Programming Interface (API) in the non-volatile state storage.

8. The system according to claim 1 further comprising:
the virtual connect device configured to manage a pool of server profiles stored in the non-volatile state storage, the server profiles comprising identifiers that uniquely describe a server; and
the virtual connect device further configured to access the non-volatile state storage and management processors to push and pull server profiles to physical or virtual computer systems.

9. The system according to claim 1 further comprising:
a physical server communicatively coupled to the virtualization platform and configured to run the operating system plurality.

10. The system according to claim 1 further comprising:
a network;
the plurality of physical servers communicatively coupled to the network and the virtualization platform, and configured to run the operating system plurality; and
the plurality of operating systems simultaneously running on at least one physical server.

11. A computer-executed method for operating a virtualized computing system comprising:
running a plurality of operating systems simultaneously on at least one physical server;
virtualizing connections between the at least one physical server and a network infrastructure;
pushing a server profile from non-volatile storage to a virtualization platform of target server before the target server bootstrap loads or powers-on, wherein the server profile comprises an identifier uniquely describes a server; and
consuming, by the target server, the target server profile and instantiating identifiers of the target server profile on virtual hardware within a virtual machine.

12. The method according to claim 11 further comprising:
controlling virtualization configuration in all conditions including powered on, powered-off, and unbooted conditions.

13. The method according to claim 11 further comprising:
performing operations on the at least one server from a remote location; and
accessing the at least one server on auxiliary-power-only when the at least one server is unbooted or powered-off.

14. The method according to claim 13 further comprising:
configuring the virtualization configuration via a remote Application Programming Interface (API).

15. The method according to claim 11 further comprising:
managing a pool of server profiles that comprise identifiers that uniquely describe a server;
pushing and pulling server profiles to physical or virtual servers whereby server profiles can be pushed to a target server even before the target server bootstrap loads or powers-on.

16. A computing system, comprising:
non-volatile storage containing a plurality of server profiles;
a baseboard management controller coupled to said non-volatile storage, said baseboard management and non-volatile storage receiving an auxiliary power source enabling the baseboard management controller to store server profiles in the non-volatile storage even when the computing system is powered off;
a virtual connect device to virtualize connections between the computing system and a network; and
a virtualization platform to run a plurality of operating systems;
wherein, while said computing system is powered off, said virtual connect device causes the baseboard management controller to push a profile into the non-volatile storage to thereby cause the virtualization platform to configure a virtual machine after the computing system powers on.

17. The computing system of claim 16 wherein the profile includes at least one of a universal unique identifier, serial number, media access control address, and world wide name.

* * * * *